United States Patent
Schwie

(10) Patent No.: US 10,178,448 B2
(45) Date of Patent: Jan. 8, 2019

(54) WIDE AREA ULTRA-LOW PRESSURE MONITORING SYSTEM

(71) Applicant: Bradford Charles Schwie, St. Paul, MN (US)

(72) Inventor: Bradford Charles Schwie, St. Paul, MN (US)

( * ) Notice: Subject to any disclaimer, the term of this patent is extended or adjusted under 35 U.S.C. 154(b) by 0 days.

(21) Appl. No.: 15/430,937

(22) Filed: Feb. 13, 2017

(65) Prior Publication Data

US 2017/0238071 A1    Aug. 17, 2017

Related U.S. Application Data

(60) Provisional application No. 62/294,952, filed on Feb. 12, 2016.

(51) Int. Cl.
*H04Q 9/00* (2006.01)
*G01L 19/00* (2006.01)
*H02J 3/38* (2006.01)

(52) U.S. Cl.
CPC ........... *H04Q 9/00* (2013.01); *G01L 19/0007* (2013.01); *H02J 3/383* (2013.01); *H04Q 2209/40* (2013.01); *H04Q 2209/88* (2013.01)

(58) Field of Classification Search
CPC ................................ G01L 19/0007; F24F 7/06

USPC ....................................................... 340/870.02
See application file for complete search history.

(56) References Cited

U.S. PATENT DOCUMENTS

2014/0252099 A1*  9/2014  Hatton ...................... F24F 7/06
                                                        236/44 A

OTHER PUBLICATIONS

Vaportrac—downloaded on Apr. 15, 2017 from http://www.vaportrac.com/.
Vaportrac 2—downloaded on Apr. 15, 2017 from http://www.vapordynamics.com/vapor-guardian-600.html.
Vaportrac 3—downloaded on Apr. 15, 2017 from http://www.vapordynamics.com/vapor-guardian-5500.html.

* cited by examiner

*Primary Examiner* — Albert K Wong

(57) ABSTRACT

An ultra-low pressure monitoring system can include an embedded server comprising a base radio and memory. In some embodiments, the embedded server is communicatively coupled to a third-party database. The system can include a first monitoring device comprising a first ultra-low pressure sensor and a first radio communicatively coupled to the base radio. The embedded server can be remotely located with respect to the first monitoring device whereby the embedded server receives first pressure data from the first monitoring device.

20 Claims, 4 Drawing Sheets

WIDE AREA ULTRA-LOW PRESSURE MONITORING SYSTEM

CROSS-REFERENCE TO RELATED APPLICATIONS

This application claims the benefit of U.S. Provisional Patent Application No. 62/294,952; filed Feb. 12, 2016; and entitled WIDE AREA ULTRA-LOW PRESSURE MONITORING SYSTEM; the entire contents of which are incorporated herein by reference.

BACKGROUND

Field

The invention is directed in general to sub-slab depressurization systems, and more specifically, to measure, record, and transmit ultra-low pressure measurements created by a sub-slab depressurization system and notify applicable parties.

SUMMARY

The disclosure includes an ultra-low pressure monitoring system, comprising an embedded server comprising a base radio and memory, wherein the embedded server is communicatively coupled to a third-party database. The system can include a first monitoring device comprising a first ultra-low pressure sensor and a first radio communicatively coupled to the base radio. In some embodiments, the first monitoring device is remotely located with respect to the embedded server, and the embedded server receives first pressure data from the first monitoring device. The system can comprise a first power source electrically coupled to the first monitoring device.

In some embodiments, the system comprises a second monitoring device comprising a second ultra-low pressure sensor and a second radio communicatively coupled to at least one of the first radio and the base radio; and a second power source electrically coupled to the second monitoring device. The second monitoring device can be remotely located with respect to each of the embedded server and the first monitoring device, and the embedded server can receive second pressure data from the second sensor monitoring device.

Even still, in some embodiments, the system includes a third monitoring device comprising a third ultra-low pressure sensor and a third radio communicatively coupled to at least one of the first radio, second radio, and base radio; and a third power source electrically coupled to the third monitoring device. The third monitoring device can be remotely located with respect to each of the embedded server, first monitoring device, and second monitoring device, and the embedded server can receive third pressure data from the third sensor monitoring device.

The embedded server can receive the first pressure data, second pressure data, and third pressure data directly from at least one of the first monitoring device, second monitoring device, and third monitoring device. Additionally, the embedded server can receive the first pressure data, second pressure data, and third pressure data indirectly from at least one of the first monitoring device, second monitoring device, and third monitoring device.

The first power source can comprise a first DC power source comprising at least one of a first battery and a first solar power source, the second power source can comprise a second DC power source comprising at least one of a second battery and a second solar power source, and the third power source can comprise a third DC power source comprising at least one of a third battery and a third solar power source. In some embodiments, the first DC power source, second DC power source, and third DC power source each provide 6 to 24 volts DC.

In some embodiments, at least one of the first monitoring device, second monitoring device, and third monitoring device comprise a power converter, and at least one of the first power source, second power source, and third power source comprise an AC power source. Even still, in some embodiments, the first ultra-low pressure sensor, second ultra-low pressure sensor, and third ultra-low pressure sensor can measure pressure in the range of 0 to 10 inches of $H_2O$.

The first monitoring device can be coupled to a first sub-slab depressurization discharge pipe, the second monitoring device can be coupled to a second sub-slab depressurization discharge pipe, and the third monitoring device can be coupled to a third sub-slab depressurization discharge pipe. In some embodiments, the first monitoring device is coupled to the first sub-slab depressurization discharge pipe via a first tube that is coupled to the first sub-slab depressurization discharge pipe via a first barbed fitting, the second monitoring device is coupled to a second sub-slab depressurization discharge pipe via a second tube that is coupled to the second sub-slab depressurization discharge pipe via a second barbed fitting, and the third monitoring device is coupled to a third sub-slab depressurization discharge pipe via a third tube that is coupled to the third sub-slab depressurization discharge pipe via a third barbed fitting.

The first sub-slab depressurization discharge pipe can be coupled to a first building, the second sub-slab depressurization discharge pipe can be coupled to a second building, and the third sub-slab depressurization discharge pipe can be coupled to a third building. In some embodiments, at least one of the first sub-slab depressurization discharge pipe, second sub-slab depressurization discharge pipe, and third sub-slab depressurization discharge pipe is coupled to an exterior surface of the respective first building, second building, and third building.

In some embodiments, the embedded server, first monitoring device, second monitoring device, and third monitoring device are each located within 28 miles of each other. Additionally, the base radio, first radio, second radio, and third radio can be communicatively coupled via a frequency of 900 MHz.

The embedded server can be communicatively coupled to the third-party database via a router. In some embodiments, the memory comprises a 16 GB micro SD card. Even still, in some embodiments, the first pressure data, second pressure data, and third pressure data can be received in real-time by the third-party database. Furthermore, in some embodiments, the embedded server comprises a 1 GHz processor, a power indicator, an Ethernet indicator, a user controlled indicator, an HDMI interface, a reset button, a boot button, a power button, and wherein the embedded server weighs less than 2 ounces.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments. The above and other features of the present invention will become more apparent by describing in detail exemplary embodiments thereof with reference to the accompanying drawings, in which.

DETAILED DESCRIPTION

Figure 1:
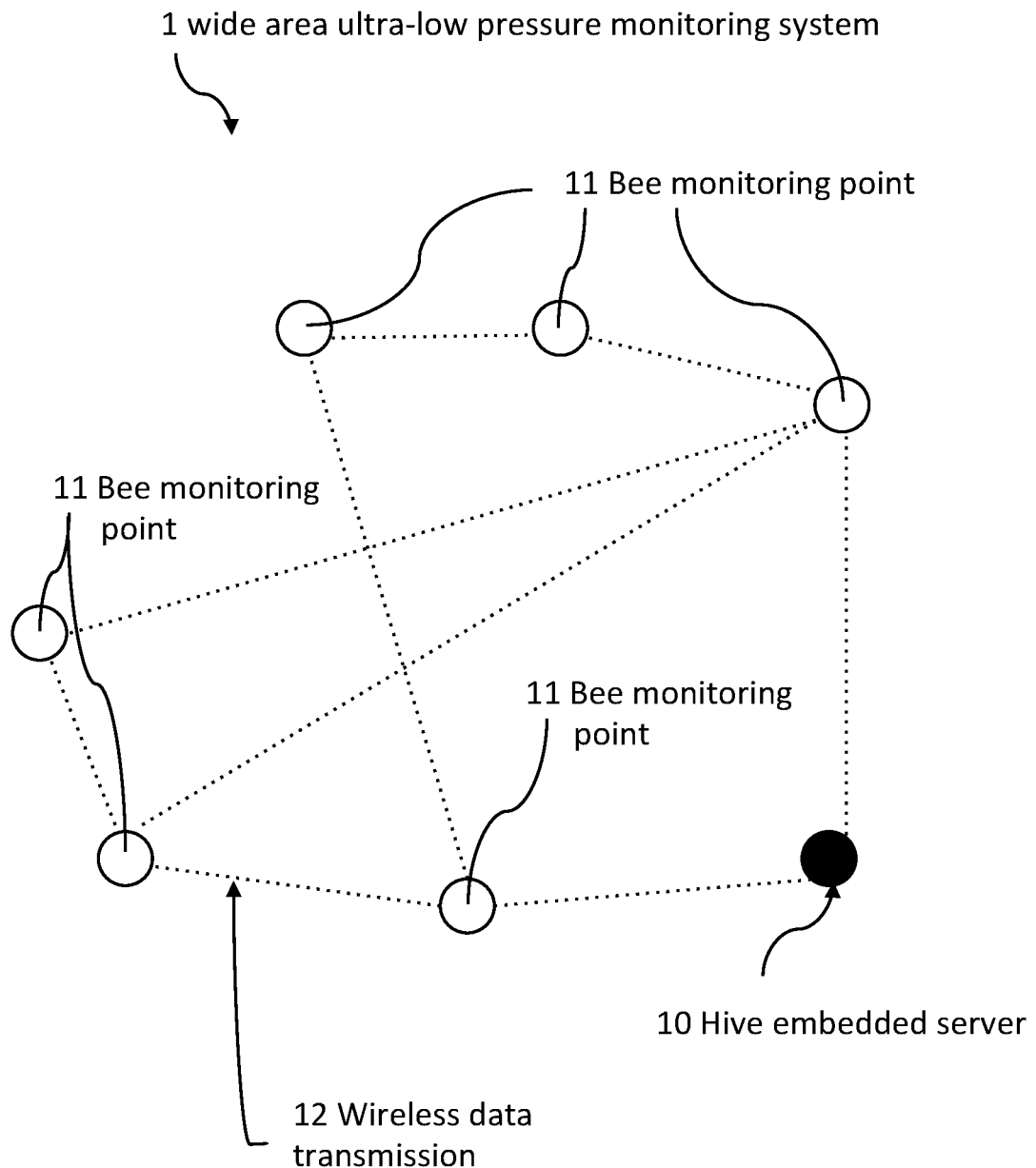
FIG. 1 illustrates a local mesh network topology for communication between monitorings point and an embedded server.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

LIST OF REFERENCE NUMERALS

10—Hive embedded server
11—Bee monitoring point
12—Wireless data transmission
20—Antenna (e.g. a dashboard antenna and/or a radio frequency antenna)
21—Power source
22—Step-down battery charging chip
23—Radio
24—Sensor
25—Ultra-low pressure tubing
26—Microprocessor
27—Quick-connect fitting
28—Optional tubing connection to sub-slab depressurization system for vapor monitoring point
29—Open-source PCB
30—Alarm and notification
31—NoSQL database
32—Memory
33—XBee PCB Breakout
34—Internet
35—Ethernet cable
40—Sub-slab depressurization discharge stack, riser pipe
41—Sub-slab depressurization fan
42—Tubing
43—Barbed fitting for vapor monitoring point Introduction In June 2015, U.S. EPA—Office of Solid Waste and Emergency Response prepared vapor intrusion guidance (OSWER Publication 9200.2-154) that discusses long-term stewardship to assess the effectiveness of vapor intrusion mitigation systems and determine when a mitigation system requires maintenance. Failure to periodically perform this inspection can result in completion pathways of vapor to the indoor air of buildings, which can result in danger to building occupants and inefficient repairs to the building or system.

Accordingly, routine inspections are expected for various types of mitigation systems, such as sub-slab depressurization systems, in which a fan creates a negative pressure in piping and in the sub-slab space beneath a building. As time progresses, the fan can become inoperable and may need to be replaced or other building conditions may allow ambient air to short-circuit previously attained negative pressures beneath the slab of the building. In most sub-slab depressurization systems, it is not obvious to the building owner as to when several fans in an area need to be replaced because the fans may be up to several thousand feet apart and may require visual and audible inspections. Consequently, a broken fan or compromised building condition can idle an otherwise operating sub-slab depressurization system creating dangerous indoor air conditions and inefficient maintenance of the sub-slab depressurization system's performance.

Routine inspections do not typically provide specific information about which specific fan needs to be replaced. Because fans or system piping may wear at different rates, the building owner would have to check all the fans/monitoring locations to determine which fan/piping is in need of maintenance. For buildings or campuses, such as large buildings with many tenants, visiting each tenant space is costly and labor intensive providing little value. Thus, there is a need for devices and methods to allow reliable inspection of mitigation systems without a person visiting each location.

In order to improve the inspection process, some sub-slab depressurization systems can include embedded sensors to indicate visual and audible notifications of system performance. Some audible systems can include a pressure sensor mounted alone or attached in series. When the pressure falls below specified criteria, the sensor can create an audible or visual notification. In more elaborate systems, an electrical wire connected in series might convey the information to a cellular connection for the building owner or occupant. Some systems may employ a sensor and data logger, which can continuously measure the pressure and thereby provide the information through visual observation to the occupants or upload the data to an Internet service.

There are disadvantages of systems with embedded sensors, namely, the monitoring data is not always documented, positive conditions indicating fan replacement to a building owner may go undiscovered, and are costly to operate as monthly subscription fees may be owed to wireless carriers and others for each monitoring location. If a sub-slab depressurization system fan is in need of replacement and the system does not generate an alarm or an occupant is not notified, and an occupant exposure condition occurs, the responsible party may be liable due to the fact that no notification was generated, documented, or acted upon.

Some existing ultra-low pressure monitoring systems exist and report results to the Internet, but do so through point-to-point connections directly to the Internet. Point-to-point connections are associated with monthly subscriber fees for wireless carriers and not necessary for campuses or residential neighborhoods where a high-density of monitoring points are installed and capable of working with each other.

The wide area ultra-low pressure monitoring system 1, as disclosed, can address the disadvantages as previously described. For example, periodic inspections can be replaced by notifications for targeted maintenance. Notifications can be triggered when the wide area ultra-low pressure monitoring system 1 detects that vacuum created by the sub-slab depressurization system has fallen below a specified value. In this regard, a technician may be notified to inspect specific locations of one or more sub-slab depressurization systems. Targeted maintenance visits to a sub-slab depressurization system from the technician may benefit occupants by reducing long-term exposure of indoor air influenced by vapor intrusion. Additional benefits for the responsible party include acquisition of performance data to demonstrate that a sub-slab depressurization system is functioning as designed, which may reduce liabilities.

The performance data may also be used to make operational tweaks to the sub-slab depressurization system if, for instance, monitoring at multiple locations shows that vacuum created in the sub-slab is more than the specified criteria, a smaller fan may be used. Furthermore, the wide area ultra-low pressure monitoring system 1 comprised of multiple monitoring points within an area reachable by local radios can eliminate the need for each monitoring point having a direct internet connection provided by wireless carriers at an additional expense. These are just a few benefits and the person of ordinary skill in the art may appreciate additional benefits.

System and Method Embodiments

Figure 2:
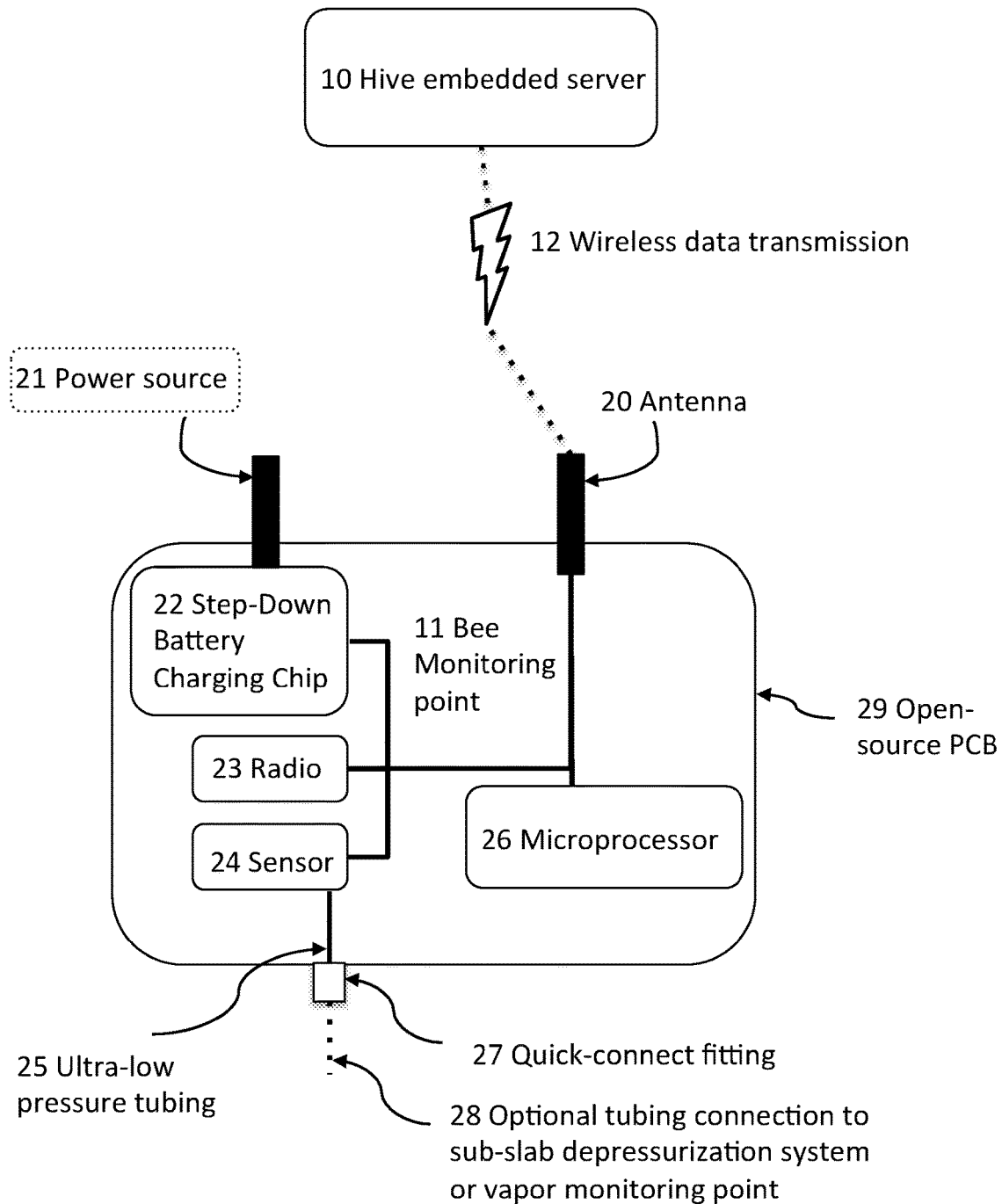
FIG. 2 illustrates components of a monitoring point.

In regards to specific embodiments, FIG. 1 illustrates the topographical view of a wide area ultra-low pressure monitoring system 1 for measuring, transmitting, and recording pressure measurements, such as those from a sub-slab depressurization discharge stack 40 or environmental mitigation and remediation system (not shown) and notifying selected parties as defined by the owner. The Bee monitoring points wirelessly transmit data in a point to point, point to multipoint, or mesh-network (pictured) protocol. In some embodiments, the wide area ultra-low pressure monitoring system 1 can include a solar panel or other power source connected to the Hive embedded server 10 and the Bee monitoring point 11. As shown in FIG. 2, the Bee monitoring point 11 can include a sensor 26 to measure differential pressures between the sub-slab and indoor air to determine if a sub-slab depressurization is functioning as designed. In other words, the sensor 26 can determine the vacuum in inches of water, typically a value between 0 and 10. When the sensor 26 provides the data to the Hive embedded server 10, the value is recorded and a notification may be sent based on the responsible parties preference.

Figure 3:
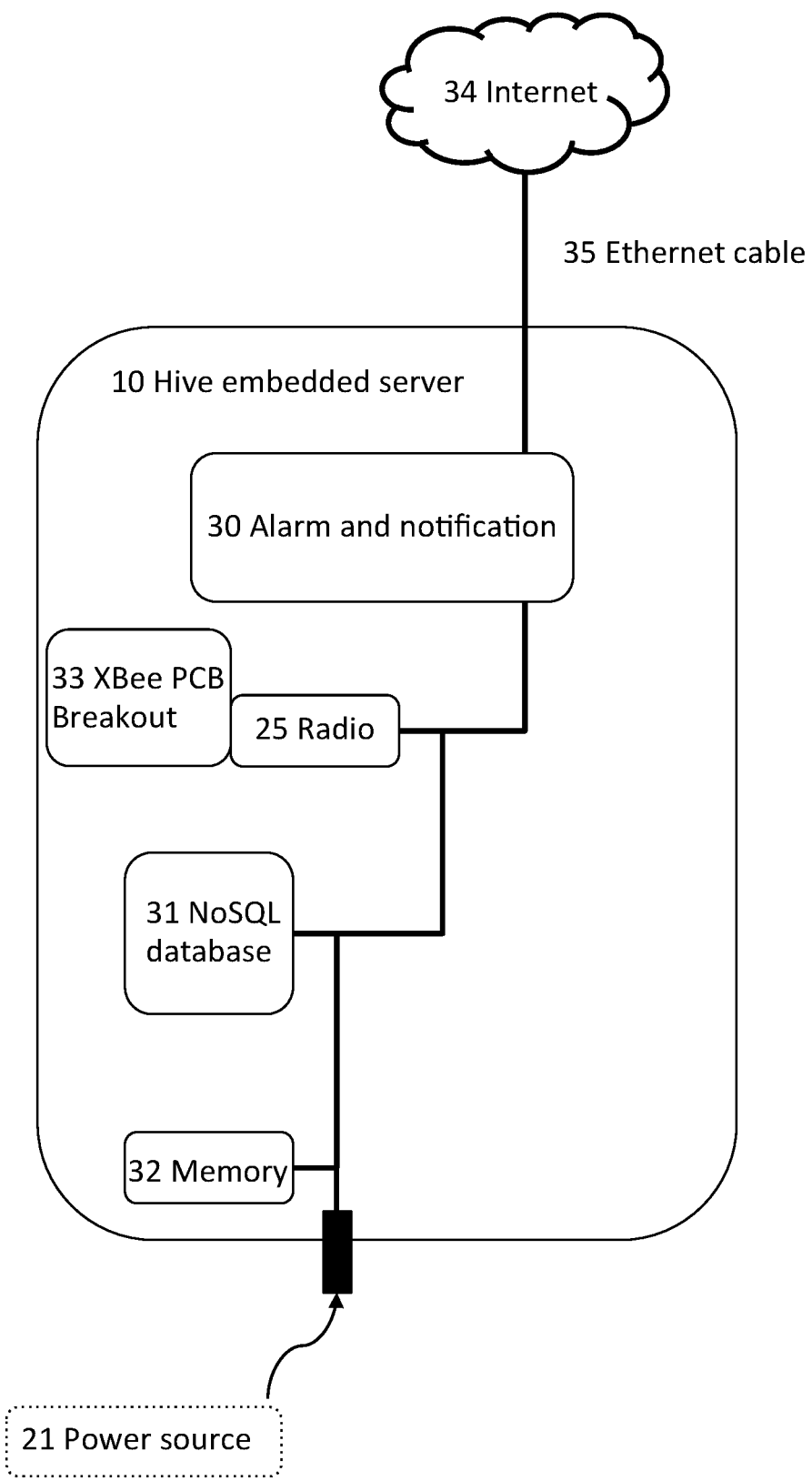
FIG. 3 illustrates functions of an embedded server.
Figure 4:
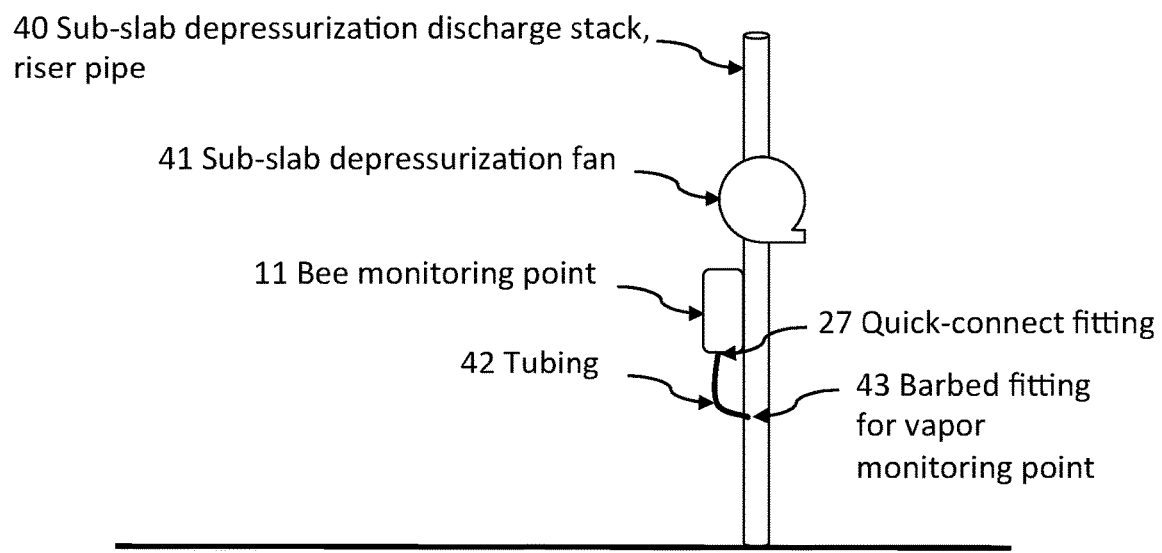
FIG. 4 illustrates a monitoring point mounted to a sub-slab depressurization system discharge pipe.

With reference to FIGS. 2-4, the Bee monitoring point 11 can be built with an open source hardware design and software code that is freely available. The open software code can allow owners to change the function of the Bee monitoring point 11 to change the recording and transmitting frequency and to use other pinouts on the board, such as add global positioning system and different types of sensors and radios. The open source hardware design can include:

- a Step-down battery charging chip 24 that allows owners to use a wide variety of DC power sources 23 to optionally charge batteries and power the Bee monitoring point 11,
- an Antenna jack 22 with TNC jack that allows input with a variety of 900 MHz radio frequency antennae,
- a Digi XBee radio 25 for connectivity over long distances,
- a Honeywell digital differential pressure sensor 26 for measuring ultra-low pressures for an extended period of time,
- an Atmel microprocessor 27 for low-powered central processing, and
- a quick-connecting fitting for attaching small diameter and ultra low-pressure pneumatic tubing 28.

Owners may also co-opt hardware pinouts on the open source PCB 29 for additional radio transmission frequencies and global positioning system products.

The Hive embedded server 10 can comprise a BeagleBone Black low-power open-source hardware single-board computer produced by Texas Instruments and attached to an XBee PCB breakout 33 enabling connectivity with a Digi XBee radio 25 for communication with Bee monitoring points. The BeagleBone Black can run a modified version of Debian Linux with CouchDB, an open source NoSQL database 31, and open source Apache web server (not pictured) with data stored on a MicroSD Memory 32 card.

The Hive embedded server 10 can store data in the open source NoSQL database and provides a limited web interface for viewing historical measurements. Additionally, the Hive embedded server 10 can connect to the Internet 34 with an Ethernet cable 35 and a router running OpenWRT (not pictured) and a modem (not pictured) or equivalent device provided by an Internet 34 service provider. Furthermore, the Hive 10 may optionally be updated remotely and attached to an Internet protocol power management switch (not pictured) and an uninterruptible power supply (not pictured).

When the Bee monitoring point 11 is attached to sub-slab depressurization discharge stack, riser pipe 40, it is mounted with off-the-shelf hardware just below the sub-slab depressurization system fan 41 to minimize losses in the small diameter pneumatic tubing 42. The tubing 42 can be attached to the Bee monitoring point 10 quick-connect fitting 27 and the sub-slab depressurization discharge stack with a stainless steel barbed fitting 43 for vapor monitoring point. Data transmission between each Bee monitoring point 10 and the Hive embedded server 11 can be limited to a maximum line of sight distance of 28 miles with proper antenna type and placement. It should be appreciated that some embodiments can enable distances up to 41 miles, up to 60 miles, and even up to 100 miles.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. An ultra-low pressure monitoring system, comprising:
an embedded server comprising a base radio and memory, wherein the embedded server is communicatively coupled to a third-party database;
a first monitoring device comprising a first ultra-low pressure sensor and a first radio communicatively coupled to the base radio, wherein the first monitoring device is remotely located with respect to the embedded server, and wherein the embedded server receives first pressure data from the first monitoring device; and
tubing configured to fluidly couple to the first ultra-low pressure sensor and extend through a surface of a riser pipe, wherein the tubing is located between an inlet and an outlet of the riser pipe.

2. The system of claim 1, further comprising a first power source electrically coupled to the first monitoring device.

3. The system of claim 2, further comprising a second monitoring device comprising a second ultra-low pressure sensor and a second radio communicatively coupled to at least one of the first radio and the base radio; and a second power source electrically coupled to the second monitoring device, wherein the second monitoring device is remotely located with respect to each of the embedded server and the first monitoring device, and wherein the embedded server receives second pressure data from the second sensor monitoring device.

4. The system of claim 3, further comprising a third monitoring device comprising a third ultra-low pressure sensor and a third radio communicatively coupled to at least one of the first radio, second radio, and base radio; and a third power source electrically coupled to the third monitoring device, wherein the third monitoring device is remotely located with respect to each of the embedded server, first monitoring device, and second monitoring device, and wherein the embedded server receives third pressure data from the third sensor monitoring device.

5. The system of claim 4, wherein the embedded server receives the first pressure data, second pressure data, and third pressure data directly from at least one of the first monitoring device, second monitoring device, and third monitoring device.

6. The system of claim 4, wherein the embedded server receives the first pressure data, second pressure data, and third pressure data indirectly from at least one of the first monitoring device, second monitoring device, and third monitoring device.

7. The system of claim 4, wherein the first power source comprises a first DC power source comprising at least one of a first battery and a first solar power source, the second power source comprises a second DC power source comprising at least one of a second battery and a second solar power source, and the third power source comprises a third DC power source comprising at least one of a third battery and a third solar power source.

8. The system of claim 4, wherein at least one of the first monitoring device, second monitoring device, and third monitoring device comprise a power converter, and at least one of the first power source, second power source, and third power source comprise an AC power source.

9. The system of claim 4, wherein the first ultra-low pressure sensor, second ultra-low pressure sensor, and third ultra-low pressure sensor measure pressure in the range of 0 to 10 inches of $H_2O$.

10. The system of claim 4, wherein the first monitoring device is coupled to a first sub-slab depressurization system discharge pipe, the second monitoring device is coupled to a second sub-slab depressurization system discharge pipe, and the third monitoring device is coupled to a third sub-slab depressurization system discharge pipe.

11. The system of claim 10, wherein the first monitoring device is coupled to the first sub-slab depressurization system discharge pipe via a first tube that is coupled to the first sub-slab depressurization system discharge pipe via a first barbed fitting, the second monitoring device is coupled to a second sub-slab depressurization system discharge pipe via a second tube that is coupled to the second sub-slab depressurization system discharge pipe via a second barbed fitting, and the third monitoring device is coupled to a third sub-slab depressurization system discharge pipe via a third tube that is coupled to the third sub-slab depressurization system discharge pipe via a third barbed fitting.

12. The system of claim 11, wherein the first sub-slab depressurization system discharge pipe is coupled to a first building, the second sub-slab depressurization system discharge pipe is coupled to a second building, and the third sub-slab depressurization system discharge pipe is coupled to a third building, wherein at least one of the first sub-slab depressurization system discharge pipe, second sub-slab depressurization system discharge pipe, and third sub-slab depressurization system discharge pipe is coupled to an exterior surface of the respective first building, second building, and third building.

13. The system of claim 4, wherein the embedded server, first monitoring device, second monitoring device, and third monitoring device are each located within 28 miles of each other.

14. The system of claim 4, wherein the base radio, first radio, second radio, and third radio are communicatively coupled via a frequency of 900 MHz.

15. The system of claim 4, wherein the embedded server is communicatively coupled to the third-party database via a router.

16. The system of claim 15, wherein the memory comprises a 16 GB micro SD card, wherein the first pressure data, second pressure data, and third pressure data are received in real-time by the third-party database.

17. The system of claim 16, wherein the embedded server comprises a 1 GHz processor, a power indicator, an Ethernet indicator, a user controlled indicator, an HDMI interface, a reset button, a boot button, and a power button.

18. The system of claim 1, wherein the tubing is configured to be fluidly coupled to an interior portion of the riser pipe.

19. The system of claim 18, wherein the first monitoring device is configured to determine a differential pressure between the interior portion of the riser pipe and indoor air located outside the interior portion of the riser pipe.

20. The system of claim 18, wherein the first ultra-low pressure sensor is located external to the interior portion of the riser pipe such that the first ultra-low pressure sensor does not physically contact a surface of the riser pipe.

* * * * *